Sept. 3, 1935. H. E. BALSIGER 2,013,397
HYDRAULIC MOTOR AND METHOD FOR MAKING THE SAME
Original Filed Aug. 26, 1930 5 Sheets-Sheet 3

INVENTOR
Harold E. Balsiger
BY
ATTORNEY

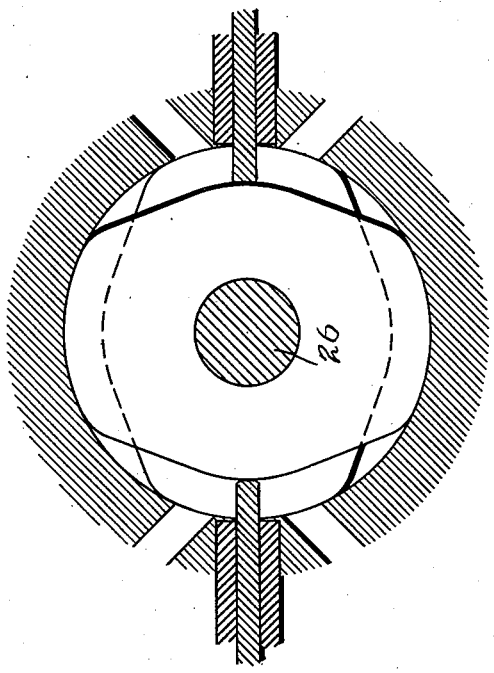
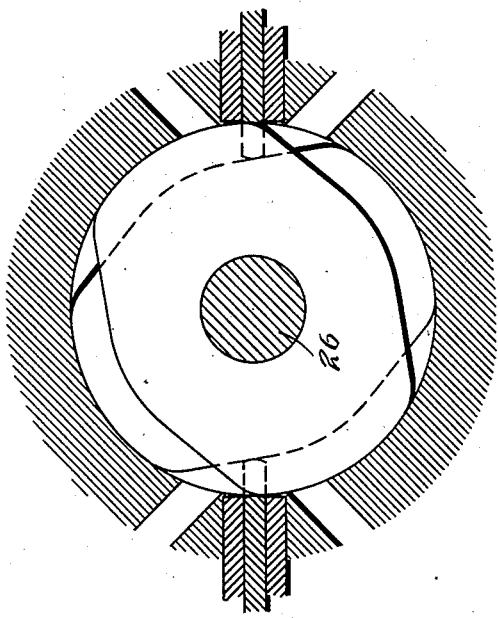
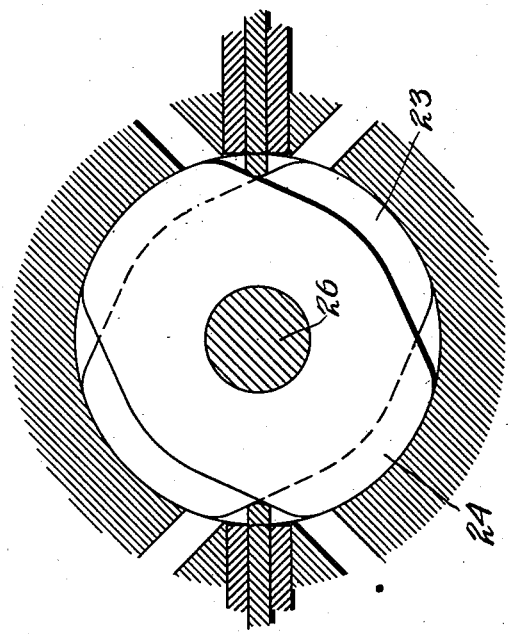

Sept. 3, 1935.   H. E. BALSIGER   2,013,397
HYDRAULIC MOTOR AND METHOD FOR MAKING THE SAME
Original Filed Aug. 26, 1930   5 Sheets-Sheet 5

*INVENTOR*
*Harold E. Balsiger*
BY
ATTORNEY

Patented Sept. 3, 1935

2,013,397

UNITED STATES PATENT OFFICE 2,013,397

HYDRAULIC MOTOR AND METHOD FOR MAKING THE SAME

Harold E. Balsiger, Waynesboro, Pa., assignor to Landis Tool Company, Waynesboro, Pa., a corporation of Pennsylvania Application August 26, 1930, Serial No. 477,878
Renewed January 5, 1935

3 Claims. (Cl. 121—75)

This invention relates to hydraulic motors and particularly to motors having rotary pistons and the object of the invention is to provide a motor having a rotor of such shape as will allow a constant flow of fluid at all times to insure smooth running.

A further object of the invention therefore is to provide a motor having a smooth even flow of speed and power without impulses or oil hammers and in which other objectionable vibrations are eliminated.

A further object is to provide a method of designing rotors having such contours as will allow the flow of fluid to be constant at every instant during the rotation of the rotors.

The invention consists of a reversible fluid motor having a pair of double-lobed rotors set at right angles to each other, such rotors having contours which will insure that the rate of motor displacement at any instant of rotation is equal to a constant.

Figure 1:
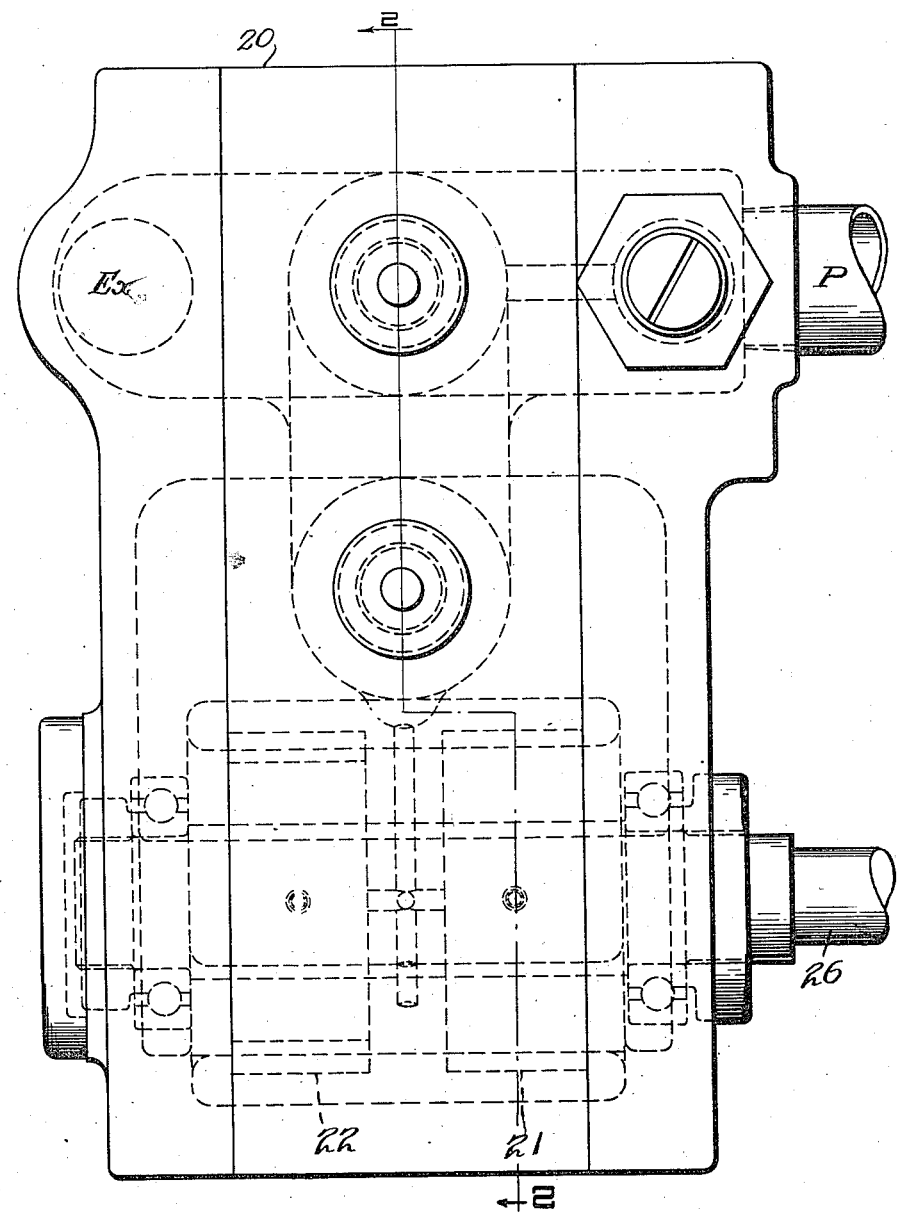
Figure 2:
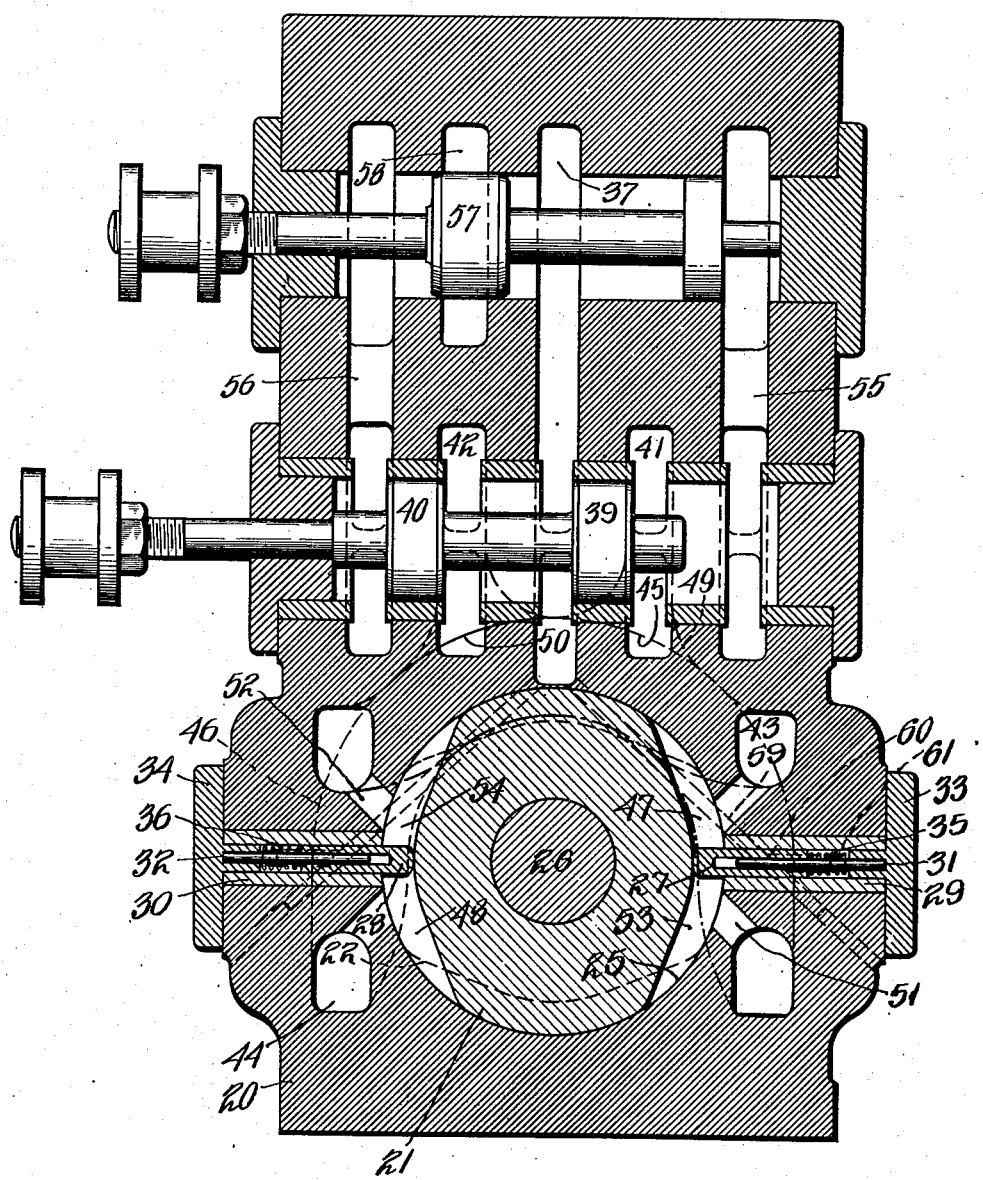
Figure 3:
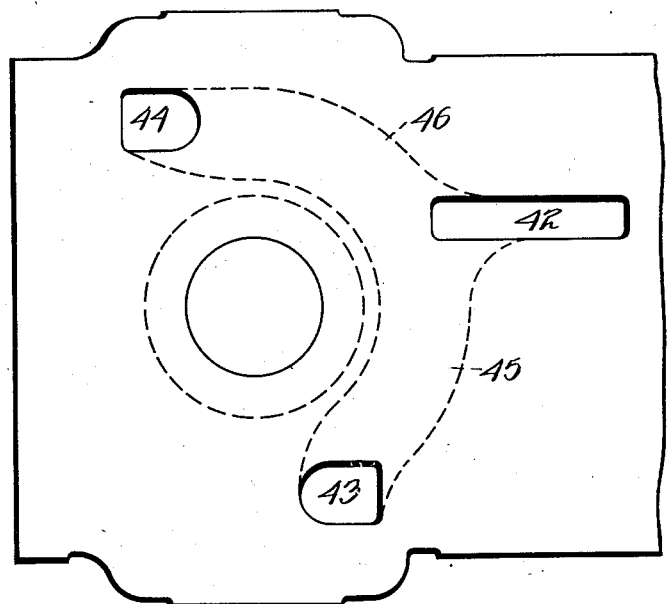
Figure 4:
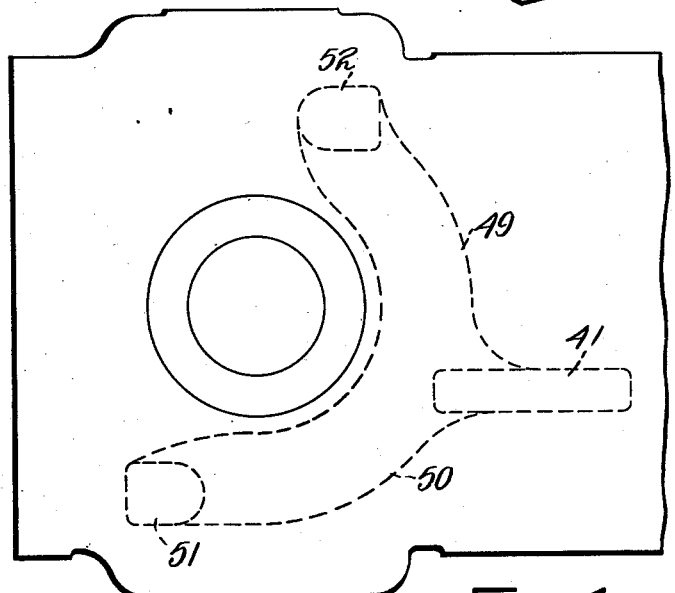
Figure 8:
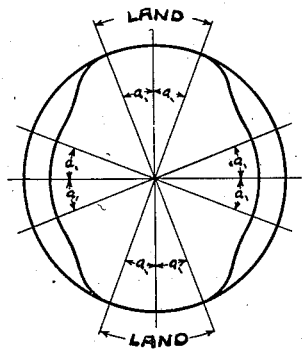
Figure 9:
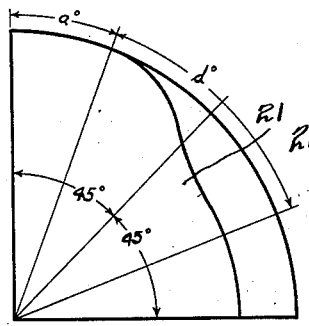
Figure 10:
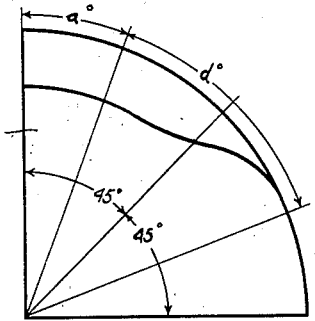
Figure 11:
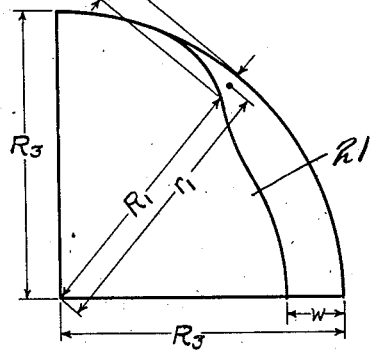
Figure 12:
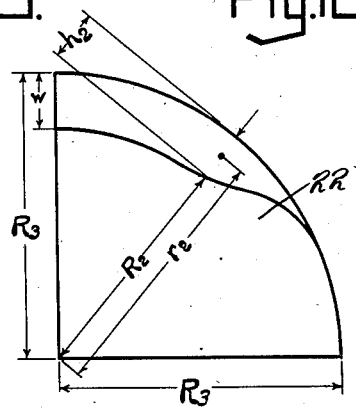
Figure 13:
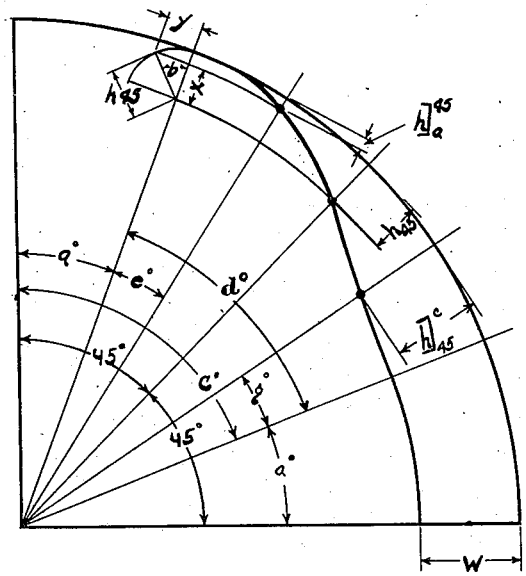

Referring to the accompanying drawings, which are made a part hereof and on which similar reference characters indicate similar parts, Figure 1 is a plan view of the motor, Figure 2, an end section substantially on line 2—2 of Figure 1, Figures 3 and 4 are end plates of the motor casing, Figures 5, 6 and 7, diagrammatic illustrations of different positions of the rotor during operation of the motor, Figure 8 is a diagram of the rotor in the motor showing certain principles followed in laying out the rotor, Figures 9 and 10 show corresponding positions of one quadrant on each rotor, the rotors being at right angles to each other, Figures 11 and 12 show the rotors in the same positions as in 9 and 10 and illustrate the method used in laying out the rotor, and Figure 13 is a diagram illustrating further the method of determining the contour of the rotor.

When the flow between one side of a rotor and the bore of the chamber in which it operates is at a maximum the flow between one side of the other rotor and the bore in the chamber is zero. As the first flow approaches zero the second flow approaches the maximum at the same rate provided the contour of the rotor is such that the sum of the increasing flow and the decreasing flow is always constant and is equal to the displacement of the motor. The method used in determining the contour of the rotor of this invention contemplates providing a rotor in which the contour will be such as to secure this desired result. Since the invention lies principally in the method of determining the contour of the rotor only so much of the remaining machine will be described as is necessary to indicate the kind of motor with which the rotor is used.

In the drawings, Figures 1 and 2, 3, 4, and 5, reference character 20 indicates the body of the motor having rotors 21 and 22, the rotors having lobes 23 and 24 at their opposite sides which lobes engage the inner walls 25 of the motor chamber. 26 indicates the shaft upon which the rotors are mounted. Blades 27 and 28 are slidably positioned between bearing plates 29 and 30 mounted in the body of the motor 20. Guides 31 and 32 supported by caps 33 and 34 support springs 35 and 36 positioned between the blades and the caps to urge the blades into engagement with the periphery of the rotor. The body of the motor is provided with an inlet port 37 for motive fluid. A valve 38 having valve disks 39 and 40 control admission of motive fluid from the chamber 37 to the chambers 41 and 42. Motive fluid passes from the chamber 42 to ports 43 and 44 through passages 45 and 46 respectively into chambers 47 and 48 in the motor. Fluid passes from chamber 41 through ports 49 and 50 to ports 51 and 52 into the motor chambers 53 and 54 respectively. Ports 55 and 56 connect the exhaust line which connects with an exhaust conduit not shown. At 57 is shown a valve which may be manually operable to by-pass fluid directly from the inlet port 37 to an exhaust port 58 to prevent operation of the motor or in other words to by-pass motive fluid around the motor. Ports 59 communicate at one end with the inlet port 37 and connect through port 60 and port 61 with a chamber at the rear of blades 27 and 28. The purpose of these passages is to supply pressure fluid at all times against the blades to keep them in fluid sealing contact with the periphery of the rotors. From the foregoing description and referring to Figs. 2, 3, and 4 it should be apparent that when valve 38 is in the position in which it is shown that pressure fluid will be delivered from the port 37 through the chamber 42 and the ports 45 and 46 to the ports 43 and 44 respectively to drive the rotors in a counterclockwise direction as shown in Figure 2. When the valve 38 is shifted to the right to open communication between port 37 and 41 fluid is delivered through ports 49 and 50 into the ports 51 and 52, Figs. 2 and 4 through which fluid enters into chamber 53 and 54 to drive the rotors in a clockwise direction. It is thought from the description so far given that the operation of the motor should be understood.

The method for laying out the rotors themselves so that their contours will be of such a shape as to provide motor chambers of the right displacement at all times will now be explained. Referring especially to Figures 8 to 13 inclusive, let us assume that the rotor is in the position shown in Figure 8. There is a portion of the rotor included in angles $a$, $a$, which is designated as the land of the rotor. By the term "land" is meant the portion of the rotor which is actually in engagment with the inside of the motor chamber, i. e., the end of the land is the point at which the contour of the rotor changes from a perfect cylindrical surface to the peculiar form of contour later to be described.

In order to determine what shape the contour of this rotor shall assume and to determine how this contour shall be cut it is necessary to determine a series of points through which the contour must pass.

This may be done by locating a point at 45° through which the contour must pass, and then locating a suitable number of points, e. g., every degree between $a°$ and 45° and a like number of points between 45° and $c°$, Figure 13. Such points may be represented by formulæ as follows:

$$\text{at } 45°, h_{45} = R_3 - \sqrt{R_3^2 - wR_3 + \frac{w^2}{2}}$$

In this formula $w$ and $R_3$ are all known quantities. The positions at less than 45°, or $$h\Big]_a^{45} = h_{45}\left(1 - \cos\frac{90e}{45-a}\right)$$

In this formula all quantities are known except $h_{45}$ which may be determined from the formula given above.

All points beyond the 45° angle may be located by formula:

$$h\Big]_{45}^c = R_3 - \sqrt{R_3^2 + 2R_3 h\Big]_a^{45} - \left(h\Big]_a^{45}\right)^2 - 2wR_3 + w^2}$$

In this formula all the quantities are known or may be determined from the two foregoing formulæ.

The method of determining the points represented by the above formulæ will now be explained:

In working out the formulæ which are used the following key is used:

$Q_t$ = the total motor displacement. $Q = \frac{1}{2}Q_t$.
$Q_1 = \frac{1}{2}$ the motor displacement per unit of width.
$R_3$ = the maximum radius of the rotor or the radius of the bore forming the motor chamber.
$R_1$ = the distance from the center of the rotor 21 to any point in its periphery.
$R_2$ = distance from the center of rotor 22 to any point in its periphery at the same instant as $R_1$.
$h_1$ = distance from any blade contact point on the periphery of the rotor 21 to the inside of the motor chamber.
$h_2$ = the corresponding distance on rotor 22 at the same instant.
$h_{45} = h_1$ when $R_1$ lies at 45°, or at a point where the displacement of all rotors is equal.

$$h\Big]_a^{45} = h_1$$

when $h_1$ lies between $a°$ and 45° or $=h_2$ when $h_2$ lies between $a°$ and 45°.

$$h\Big]_{45}^c = h_1$$

when $h_1$ lies between $c°$ and 45° or $=h_2$ when $h_2$ lies between $c°$ and 45°.

$n$ = number of revolutions per unit of time.
$w$ = the maximum distance from the periphery of the rotor 21 or 22 to the inside of the motor chamber or the drop of the rotor.
$\pi$ = its usual meaning, i. e., 3.1416.
Land = the number of degrees with which the rotor contacts with the inside of the motor chamber.

$a = \frac{1}{2}$ the angle of the land.
$b$ = a variable angle shown at $b$ in Fig. 13.
$c$ = the angle between the end of the rotor drop and the center line of the rotor.
$x$ = horizontal component of angle "$b$" in Fig. 13.
$y$ = vertical component of angle "$b$" in Fig. 13.
$d$ = number of degrees during which the contour radius ($R_1$ and $R_2$) varies. That is $d = (c-a)$.
$f$ = width of the rotors.
$A$ = area = $hf$.
$V$ = velocity of center gravity of area of $A = 2\pi rn$, where $r$ = radius from the center of rotation to the center of gravity of area A.
$r_1 = r$ for rotor 21; $r_2 = r$ for rotor 22.
$e$ varies from 0° to $45°-a°$ between the angle $a°$ and the angle 45°.
$g$ varies between angle $a_1°$ and angle 45° and is equal in value to $e°$.

Let us first consider the primary shape of these rotors. Let 21 represent one rotor and 22 represent the other rotor. These rotors are set at 90° from each other. The rotors have two lands through ($2a$) degrees one located at 180° from the other. While the lands on the rotors revolve over the blades there is no displacement for that rotor so that at the time one rotor is not causing any displacement, the other must be causing the total displacement ($Q_t$) of the motor. To simplify the study of the rotor contour the rotor is divided into quadrants which are of the same shape and therefore only one quadrant of each rotor need be considered. While the rotors are revolving through $2a°$, Figs. 9 and 10, the displacement of rotor 21 is zero and the displacement of rotor 22 is maximum. During $d°$ of rotation the rate of displacement of one rotor is increasing to maximum and the rate of displacement of the other rotor is decreasing to zero. The displacement of rotor 21 is equal to the rate of displacement of rotor 22 at 45°.

The rate of displacement at any instant is equal to the sum of the product of the cross section areas of the exposed portion of each blade, and the velocity at which the center of gravity of the several areas are moving or, $$Q_t = 2A_1V_1 + 2A_2V_2$$

or $$\frac{Q_t}{2} = A_1V_1 + A_2V_2$$

Then since $$Q = \frac{Q_t}{2}$$

$$Q = A_1V_1 + A_2V_2$$

The velocity V equals $2\pi rn$ and the cross section A equal $hf$ or $A = h$ per unit of width.

Then $Q_1 = 2\pi r_1 h_1 n + 2\pi r_2 h_2 n$ (1) $\quad Q_1 = 2\pi n(r_1 h_1 + r_2 h_2)$ (2) $\quad \text{Also } Q_1 = 2\pi wn\left(R_3 - \frac{w}{2}\right)$ (3) $\quad r_1 = R_3 - \frac{h_1}{2} - \frac{R_3 - h\Big]_a^{45}}{2}$ when $r_1$ lies between $a°$ and $45°$ and $=r_2$ when $r_2$ lies between $a°$ and $45°$.

(4) $$r_2 = R_3 - \frac{h_2}{2}$$

Now since the rate of displacement of rotor 21 equals the rate of displacement of rotor 22 at $45°$ the following formula is derived:

$$h_1 = h_2 = h_{45} \text{ and } r_1 = r_2 = r_{45}$$

Then rewriting Equation No. 1:

$$Q_1 = 2\pi n 2 r_{45} h_{45} \text{ or } Q_1 = 4\pi r_{45} h_{45} n$$

$$r_1 = \frac{Q_1}{4\pi h_{45} n}$$

Substituting Equation No. 3 for $r_{45}$

Where $r_1 = r_{45}$ and $h_1 = h_{45}$:

$$R_3 - \frac{h_{45}}{2} = \frac{Q_1}{4\pi h_{45} n}$$

Multiply by $(-2h_{45})$ and add $R_3^2$, $$R_3^2 - 2R_3 h_{45} + h_{45}^2 = R_3^2 - \frac{Q_1}{2\pi n}$$

$$R_3 - h_{45} = \sqrt{R_3^2 - \frac{Q_1}{2\pi n}}$$

$$h_{45} = R_3 - \sqrt{R_3^2 - \frac{Q_1}{2\pi n}}$$

Substituting Equation No. 2 for $Q_1$ $$h_{45} = R_3 - \sqrt{R_3^2 - \frac{2\pi w n\left(R_3 - \frac{w}{2}\right)}{2\pi n}}$$

(5) $$h_{45} = R_3 - \sqrt{R_3^2 - w R_3 + \frac{w^2}{2}}$$

By use of Equation 5, the value of $h_{45}$ can be found, which locates the rotor contour at $45°$.

The contour from $a°$ to $45°$ may be any smooth curve such as the simple harmonic, ellipse, parabola, uniform acceleration, and others. We prefer simple harmonic motion, which gives a good blade action and may be found by the formula which is derived:

$$x = h_{45} - h\Big]_a^{45} \quad \text{Note: Fig. 13}$$

(6) $$x = h_{45} \cos b \quad \text{Note: Fig. 13}$$

$$h\Big]_a^{45} = h_{45} - x$$

Substituting Equation No. 6 for $x$.

$$h\Big]_a^{45} = h_{45} - h_{45} \cos b$$

or $$h\Big]_a^{45} = h_{45}(1 - \cos b)$$

Since angle $b$ varies from $0°$ to $90°$, and is represented on the rotor by angle $e$ which varies from $a°$ to $45°$, $$\frac{b}{e} = \frac{90}{45-a}, \text{ or } b = \frac{90e}{45-a}$$

(7) $$h\Big]_a^{45} = h_{45}\left(1 - \cos\frac{90e}{45-a}\right)$$

This formula will establish the curve from $a°$ to $45°$.

The following derives the formula for the contour between $45°$ and $c°$.

Equations No. 1 and No. 2 equal each other, $$\therefore 2\pi n(r_1 h_1 + r_2 h_2) = 2\pi n w\left(R_3 - \frac{w}{2}\right)$$

or $$r_1 h_1 + r_2 h_2 = w\left(R_3 - \frac{w}{2}\right) = w R_3 - \frac{w^2}{2}$$

Substituting Equation No. 4 for $r_2$ $$R_3 h_2 - \frac{h_2^2}{2} = w R_3 - \frac{w^2}{2} - r_1 h_1$$

Multiply by $-2$ and add $R_3^2$ $$R_3^2 - 2R_3 h_2 + h_2^2 = R_3^2 + 2r_1 h_1 - 2w R_3 + w^2$$

$$R_3 - h_2 = \sqrt{R_3^2 + 2r_1 h_1 - 2w R_3 + w^2}$$

$$h_2 = R_3 - \sqrt{R_3^2 + 2r_1 h_1 - 2w R_3 + w^2}$$

Substituting $$h\Big]_{45}^{c} \text{ for } h_2, h\Big]_a^{45} \text{ for } h_1 \text{ and } R_3 - \frac{h\Big]_a^{45}}{2} \text{ for } r_1$$

$$h\Big]_{45}^{c} = R_3 - \sqrt{R_3^2 + 2\left(R_3 - \frac{h\Big]_a^{45}}{2}\right) h\Big]_a^{45} - 2w R_3 + w^2}$$

(8) $$h\Big]_{45}^{c} = R_3 - \sqrt{R_3^2 + 2R_3 h\Big]_a^{45} - \left(h\Big]_a^{45}\right)^2 - 2w R_3 + w^2}$$

Therefore from Equations 5, 7, and 8, all points of the contour may be figured.

Since any $$h\Big]_{45}^{c}$$

depends on $$h\Big]_a^{45}$$

then $$h\Big]_a^{45}$$

depends on $$h\Big]_{45}^{c}$$

If any $$h\Big]_{45}^{c}$$

is known $$h\Big]_a^{45}$$

may be calculated by the use of Eq. 8 with the correct substitutions as follows:

$$h\Big]_a^{45} = R_3 - \sqrt{R_3^2 + 2R_3 h\Big]_{45}^{c} - \left(h\Big]_{45}^{c}\right)^2 - 2w R_3 + w^2}$$

or it follows that if any $h$ is known on any portion of the rotor the corresponding $h$, say $h_x$ on the other rotor or the complementary $h$ on the same rotor can be determined by the proper use of Formula 8 where the known value of $h$ is substituted for the $h$'s under the radical sign. Formula 8 may be written as follows for this purpose $$h_x = R_3 - \sqrt{R_3^2 + 2R_3 h - h^2 - 2w R_3 + w^2}$$

The methods and type of equipment used in the making and manufacturing of cams for internal combustion engines are suitable for making these rotors and in making the model from which the master cams are made a cutter should be used which has the same radius as the radius on the contacting end of the blades.

The method of determining the contour of a rotor which will give the desired results may be summarized briefly as follows:

First, decide on the number of lobes, the length of land, the maximum blade movement, the bore of the motor, and the distance through which the rate of maximum displacement of the rotor occurs.

Second, determine the value of $h$ at the point in the peripheral surface of the rotor where the rates of displacement of all rotors are equal and the sum of the rates of displacement is equal to the motor displacement which is a constant.

Third, calculate a sufficient number of points to determine the contour from the end of the portion of zero rate of displacement to the point of equal displacement.

Fourth, calculate a similar number of points from the point of equal rate of displacement to the beginning of the portion of maximum rate of displacement.

Having thus fully described my said invention, what I claim as new and desire to secure by Letters Patent, is:

1. A device of the kind described comprising a casing, abutments in said casing, rotors in said casing adapted to revolve about a common axis, said rotors having high and low portions adapted to be engaged by said abutments said high and low portions being spaced about said axis at such a phase angle that one rotor will be engaged on the high portion when the other is engaged on the low portion, curves on each of said rotors joining said high and low portions of each of said rotors, said curves being determined by the formulæ:

$$h_{45} = R_3 - \sqrt{R_3^2 - wR_3 + \frac{w^2}{2}}$$

$$h\Big]_a^{45} = h_{45}\left(1 - \cos\frac{90e}{45-a}\right)$$

$$h\Big]_{45}^c = R_3 - \sqrt{R_3^2 + 2R_3 h\Big]_a^{45} - \left(h\Big]_a^{45}\right)^2 - 2wR_3 + w^2}$$

2. A device of the kind described comprising a casing, abutments in said casing, rotors in said casing adapted to revolve about a common axis, said rotors having high and low portions adapted to be engaged by said abutments said high and low portions being spaced about said axis at such a phase angle that one rotor will be engaged on the high portion when the other is engaged on the low portion, curves on each of said rotors joining said high and low portions of each of said rotors, each of said curves passing through a point midway between said high and low portions, the radial position of said point being determined by the formula:

$$h_{45} = R_3 - \sqrt{R_3^2 - wR_3 + \frac{w^2}{2}}$$

the relation between the portion of the curves from said point to the high portion, and from said point to said low portion being indicated by the formula:

$$h_x = R_3 - \sqrt{R_3^2 + 2R_3 h - h^2 - 2wR_3 + w^2}$$

where $h$ is any point on one portion of said curve and $h_x$ is any corresponding point on the other portion of the said curve.

3. In a device of the kind described, a casing abutments movably mounted in said casing, a revolvable element enclosed in said casing and adapted for peripheral engagement with said abutments, fluid under pressure acting on said element to revolve said element in said casing, said element having high and low portions on its periphery, said high and low portions being spaced at equal phase angles about the axis of revolution, curves on said element joining said high and low portions, each of said curves passing through a point midway between said high and low portions, said point being located at a predetermined distance from the bore of said casing, said distance being indicated by the formula:

$$h_{45} = R_3 - \sqrt{R_3^2 - wR_3 + \frac{w^2}{2}}$$

the half of said curve extending in one direction from said mid-point bearing a definite relation to the other half of said curve, said relation being expressed by the formula:

$$h_x = R_3 - \sqrt{R_3^2 + 2R_3 h - h^2 - 2wR_3 + w^2}$$

where $h$ is any point on one portion of said curve and $h_x$ is any corresponding point on the other portion of the said curve.

HAROLD E. BALSIGER.